(12) United States Patent
Clark (10) Patent No.: US 7,717,593 B2
(45) Date of Patent: May 18, 2010

(54) DEVICE FOR IMPROVED ILLUMINATION EFFICIENCY

(75) Inventor: Roy Clark, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 194 days.

(21) Appl. No.: 11/760,386

(22) Filed: Jun. 8, 2007

(65) Prior Publication Data

US 2008/0304273 A1 Dec. 11, 2008

(51) Int. Cl.
| | |
|---|---|
| *B64D 47/02* | (2006.01) |
| *B64F 1/20* | (2006.01) |
| *F21V 21/00* | (2006.01) |
| *B60Q 1/00* | (2006.01) |
| *B60Q 3/00* | (2006.01) |

(52) U.S. Cl. ............... 362/471; 362/470; 362/484; 362/490

(58) Field of Classification Search ............ 362/470, 362/471, 490, 484
See application file for complete search history.

(56) References Cited

U.S. PATENT DOCUMENTS

| | | | |
|---|---|---|---|
| 3,358,134 A | 12/1967 | Gonyea | |
| 4,313,208 A | 1/1982 | Kavenik | |
| 5,108,048 A * | 4/1992 | Chang | 244/118.1 |
| 5,129,597 A * | 7/1992 | Manthey et al. | 244/118.5 |
| 5,395,074 A * | 3/1995 | Hart et al. | 244/118.1 |
| 5,601,034 A * | 2/1997 | Tao et al. | 105/423 |
| 5,921,670 A | 7/1999 | Schumacher | |
| 6,139,166 A | 10/2000 | Marshall | |
| 6,607,286 B2 | 8/2003 | West | |
| 6,609,813 B1 | 8/2003 | Showers | |
| 6,814,470 B2 | 11/2004 | Rizkin | |
| 6,819,506 B1 | 11/2004 | Taylor | |
| 6,846,099 B2 | 1/2005 | Dubin | |
| 6,871,981 B2 * | 3/2005 | Alexanderson et al. | 362/294 |
| 6,896,381 B2 | 5/2005 | Benitez | |

(Continued)

FOREIGN PATENT DOCUMENTS

JP          62129944 A        6/1987

OTHER PUBLICATIONS

Robert P. Friedman, Optical Designs for ultrahigh-flux infrared and solar energy collection: monolithic and dielectric tailored edge-ray concentrators, Applied Optics, pp. 6684-6691, Dec. 1, 1996, vol. 35, No. 34, Optical Society of America.

(Continued)

*Primary Examiner*—Jacob Y Choi
*Assistant Examiner*—David J Makiya
(74) *Attorney, Agent, or Firm*—Ostrager Chong Flaherty & Broitman P.C.

(57) ABSTRACT

Interior lighting and illumination systems for aircraft, particularly commercial passenger airplanes. Efficient beam forming optical light emitting diode arrangements having offset apertures for maximizing effectiveness are positioned in the ceiling panels above the aisles between sets of seats in the passenger cabins for cross bin illumination of stowage areas. The efficient beam forming optical LED devices are positioned to shine on opposite storage/stowage bins and are positioned to overcome line of height light source restrictions such as may be imposed by a valence. The devices are effective for illuminating across the aisles, thus creating a cross-bin lighting system.

18 Claims, 7 Drawing Sheets

U.S. PATENT DOCUMENTS

| | | |
|---|---|---|
| 6,899,443 B2 | 5/2005 | Rizkin |
| 6,924,943 B2 | 8/2005 | Minano |
| 6,988,815 B1 | 1/2006 | Rizkin |
| 6,993,242 B2 | 1/2006 | Holman et al. |
| 7,006,306 B2 | 2/2006 | Falicoff |
| 7,021,797 B2 | 4/2006 | Minano |
| 7,031,063 B2 | 4/2006 | Peterson |
| 7,042,655 B2 | 5/2006 | Sun |
| 7,059,731 B2 | 6/2006 | Lee |
| 7,063,440 B2 | 6/2006 | Mohacsi |
| 7,070,281 B2 | 7/2006 | Kato |
| 7,083,297 B2 | 8/2006 | Matthews |
| 7,114,827 B2 | 10/2006 | Halter |
| 7,148,632 B2 * | 12/2006 | Berman et al. .............. 315/189 |
| 7,540,639 B2 * | 6/2009 | Clark ......................... 362/471 |
| 2005/0002198 A1 | 1/2005 | Blechschmidt |
| 2006/0006821 A1 * | 1/2006 | Singer et al. ................ 315/312 |
| 2007/0053188 A1 | 3/2007 | New |
| 2007/0109802 A1 | 5/2007 | Bryan |
| 2008/0001557 A1 | 1/2008 | Dardis |

OTHER PUBLICATIONS

W. T. Welford, High Collection Nonimaging Optics, pp. 22-29, 1989, Academic Press, Inc., San Diego, California.

U.S. Unpublished U.S. Appl. No. 11/760,386 to Roy Clark, filed Jun. 8, 2007.

* cited by examiner

DEVICE FOR IMPROVED ILLUMINATION EFFICIENCY

TECHNICAL FIELD

The disclosure relates to interior illumination systems for aircraft, particularly interior illumination and lighting systems for the passenger cabins in commercial passenger airplanes.

BACKGROUND

The interior configuration, architecture, and illumination of airplanes has become relatively standardized today. The arrangement of passenger seats, passenger cabins, bulkheads, lavatories, serving areas, and the like have become developed for convenience and accommodation of both passengers and crew. Passenger compartments typically have sidewall members with a plurality of windows, a floor member and a ceiling member or assembly of some type. In addition, pluralities of rows of stowage or storage bins are positioned on the aircraft generally at the position between the sidewalls and the ceilings. For larger twin-aisle aircraft, rows of inboard stowage bins are also positioned over the seats located along the center of the passenger cabins.

The design, architecture, and lighting of the interiors of passenger aircraft, particularly the passenger cabins, have remained substantially the same for a long period of time and have not had a significant variety of changes or updates.

There continues to be a need in the aircraft industry for new and innovative solutions to passenger space, cabins, furnishings and illumination. There is also a need to change or vary the aesthetics of passenger cabins in order to improve the perception and aesthetics of the space, as well as possibly catering to the different moods of the passengers. This includes the use of changes in LED based mood lighting to emphasize the activities performed aboard an aircraft, such as boarding, resting, eating and the like.

The improvements described herein would be particularly useful in an aircraft cabin illumination system such as described in co-pending patent application Ser. No. 11/553,725 filed Oct. 27, 2006, which is a continuation of Ser. No. 11/164,267 filed Nov. 16, 2006, now abandoned. Both of these applications are incorporated herein by reference.

A large number of illumination systems employ a wide variety of light emitting diode (LED) illumination subsystems. These include those with relatively simple beam forming optical surfaces, such as seen for example U.S. Pat. Nos. 7,083,297, 7,059,731, 6,899,443, 6,988,815, 6,896,381, 6,819,506 and 6,814,470. Other beam forming optics, with more unusual shapes, including faceted surfaces are disclosed in U.S. Pat. Nos. 7,042,655, 7,021,767, 7,006,306, 6,924,943, and 6,607,286. Also, simple strip light illumination systems are disclosed, for example in U.S. Pat. Nos. 7,114,827, 7,063, 440 and 6,609,813. All of the aforementioned U.S. patents are incorporated herein by reference.

However, none of these prior designs include offset beam apertures that improve the coupling efficiency of beam forming optics as practiced in embodiments of this disclosure.

SUMMARY

Aircraft can be designed with an all LED interior lighting system and this allows the aircraft manufacturer to take advantage of the unique properties of LED lighting and to make significant advances in cabin illumination capabilities compared to conventional illumination systems based on fluorescent and incandescent sources. Specifically embodiments of this disclosure use improved LED-based lighting systems to enhance the configuration, architecture, illumination and aesthetics of passenger space of the aircraft. The improved LED-based system may be an LED modified with efficient beam-forming optics. An important feature that has been developed to achieve these improvements is the development of cross bin lighting in which the overhead storage bins are illuminated with one color and the ceiling structure between the bins is illuminated with another color. These colors may be varied during flight, but a typical passenger-pleasing color configuration may be white light illumination for the overhead bins and blue light for the ceiling area. Another important feature of the present design is that the light sources should not generally be visible to passengers in the cabin.

Additionally, any illumination system used on an aircraft is preferably both lightweight and efficient in the use of electrical power. Illumination systems based on light emitting diodes (LEDs) offer considerable advantages over conventional fluorescent or incandescent illumination sources in this regard. These include smaller source size, lower electrical power consumption and longer operating lifetimes. However, LEDs generally emit light in a different angular pattern compared to conventional sources. The efficient use of LED illumination systems therefore requires optimization of the coupling of the LED source light output into a useful illumination beam. Embodiments of this disclosure also provide novel and efficient optical means for coupling LED light sources into useful illumination beams.

Furthermore, the need to hide a cross bin lighting system from general passenger view imposes constraints on the size and placement of the light sources used for this application. The basic requirement is that the lighting sources must be placed behind a valence or similar line of sight obstruction situated on top of the overhead bins and below a plane that extends from the top of one valence to a tangent point along the lower curve of the opposite overhead bin.

The embodiments of the disclosure provide efficient beam forming optics that work in situations that have line of sight source height restrictions, such as those found in aircraft cabin cross bin lighting. In such situations, the beam coupling efficiency may be improved by using larger beam forming optics and restricting the working source height with an aperture that selects only part of the full height. Generally these apertures are not placed along the center line of the beam forming optic.

Thus, embodiments of this disclosure utilize an improved LED illumination system with efficient beam-forming optics to provide a coupling design which facilitates cross cabin illumination while remaining out of view from the passengers' perspective.

Cross-bin illumination may be provided by a set of lights on each side of the ceiling structures which direct their illumination across the ceiling space to the opposite sets of storage/stowage bins. The illumination from these lights may be directed across and under the ceiling to illuminate the storage/stowage bins (or monument or surface) located opposite from the light fixture. Typically, the color of the illumination from these lights is white but this may be changed to other colors to set specific lighting moods. A second set of lights is used to illuminate the ceiling. Typically, color of these lights is blue, but this may also be changed to set specific lighting moods. Together, the illumination from the two sets and two pairs of lights provides ceiling and cross bin illumination as necessary.

The two or more sets or arrays of the improved LEDs with efficient beam-forming optics can be positioned in various configurations, such as but not limited to being stacked one on top of the other, positioned individually side-by-side, or positioned in groups side by side. In practice an array of such LEDs with efficient beam-forming optics can run the length of an aircraft cabin.

Further details, benefits and features of embodiments of this disclosure will become apparent from the following description when taken in connection with the accompanying drawings and appended claims.

DESCRIPTION OF PREFERRED EMBODIMENTS

The need to hide aircraft cross bin lighting from general passenger view imposes restrictions on the size and placement of the light sources used for this application. The basic requirement is that the lighting sources may be placed behind a valence situated on top of the overhead bins and below a plane that extends from the top of one valence to a tangent point along the lower curve of the opposite overhead bin.

Disclosed in detail below is an LED-based illumination system having efficient beam-forming optics for improved lighting in areas where there are line-of-sight source height restrictions, such as those found in aircraft cabin cross bin lighting. The subject design provides a significant increase in optical coupling efficiency by making the area of the beam forming optics larger than the area allowed by valence line of sight restrictions. An aperture is used to select only a portion of the available area. The selection of the specific aperture area is determined by the optical properties of the LED source.

It is known in the art of illumination system design that there is a basic relationship between the area of an illumination optic and its associated beam divergence angle. This may expressed mathematically in the form:

$$A_1 \sin^2 \theta_1 = A_2 \sin^2 \theta_2$$

where A is area of the cross section of the beam shaping optic and θ is the divergence angle. The quantity $A \sin^2 \theta$ is known variously as the etendue or Lagrange invariant. The expression means that an illumination beam with a small area cross section and a large divergence angle can only be converted into a beam with a smaller divergence angle by increasing the cross section area of the beam forming optic. This is a fundamental relationship that does not depend upon the detailed shape of the optical surfaces involved.

Figure 1:
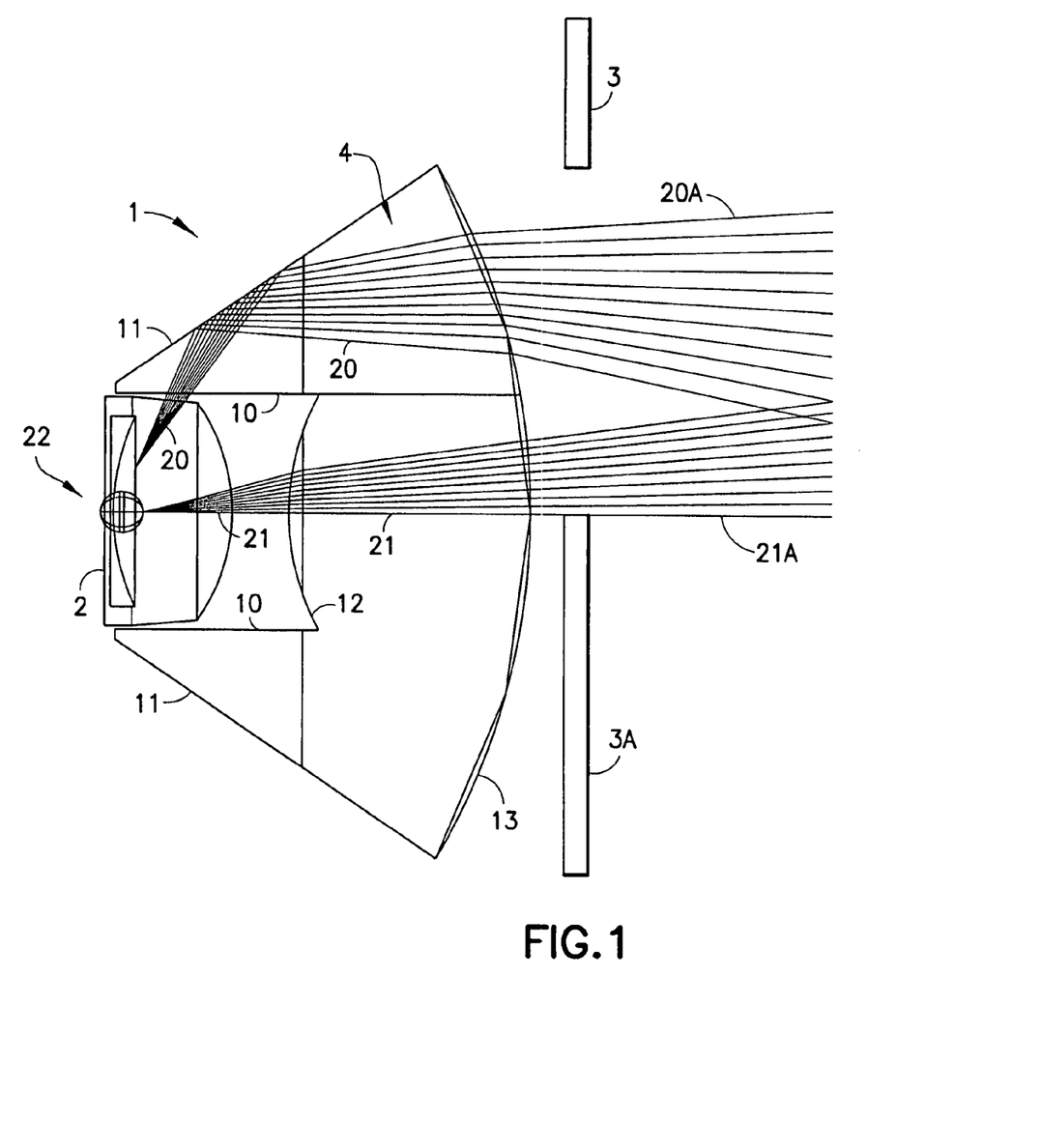
FIG. 1 is a cross section of an LED-based illumination system with efficient beam-forming optics in accordance with one embodiment of the present disclosure.

FIG. 1 is a cross section view of an efficient beam forming optical LED device 1 in accordance with the embodiments of this disclosure. A beam forming optic 4 is used to collect light from an LED 2. An aperture is used to limit the height of the output beam yet still maintain good optical coupling efficiency. In FIG. 1, the aperture is defined by the opening formed between blocking members 3 and 3A, which may be a part of the illumination assembly enclosure, and which may be a diaphragm or curtain-like members of suitable shape and material as described below. The beam forming optic comprises a combination of optical surfaces 10, 11, 12 and 13 that act in combination to shape the beam input from LED 2. Surface 10 acts to direct a beam such as beam 20 to surface 11. Beam 20 illustrates an optical beam that is emitted by the LED at a large angle from the optical axis represented by arrow 22. Surface 11 redirects this beam 20, by means of total internal reflection to surface 13 where it is further shaped and exits the beam forming optic 4. Surface 12 acts to collect a beam, such as beam 21 from the LED and direct it to surface 13 where it is further shaped and exits the beam forming optic 4. Beam 21 illustrates an optical beam that is emitted by the LED at a narrow angle from the optical axis. Surface 12 also acts to collect light that may be reflected from surface 10 and direct it to surface 13. In this embodiment, surfaces 10 and 11 are substantially flat and oriented to form an optical wedge. Surfaces 12 and 13 are substantially cylindrical and act as lenses.

The subject efficient beam forming optical LED 1 may include any suitable beam shaping element 4 in which the surfaces are curved, flat or faceted. Surface 11 may also be made reflective by other means such as coating so that its shape is not limited by the need for total internal reflection. The aperture formed between members 3 and 3A may be any suitable shape that meets the light source height limitation and optimizes the beam coupling efficiency. Beam forming optics for LED devices are available from a variety of commercial sources including Carclo Precision Optics which is part of the Technical Plastics Division of Carclo plc of Berkshire, England, and Polymer Optics Limited, also of Berkshire, England. Injection molded polycarbonate optics will be particularly useful in the subject aircraft illumination applications.

Beam paths 20 and 21 clearly show that light emitted by the LED at large angles from the optical axis exits the beam forming optic 4 at a different spatial location compared to that emitted from the LED at narrow angles. Beams 20A and 21A illustrate the LED output and beam divergence for beams 20 and 21 respectively.

Figure 2:
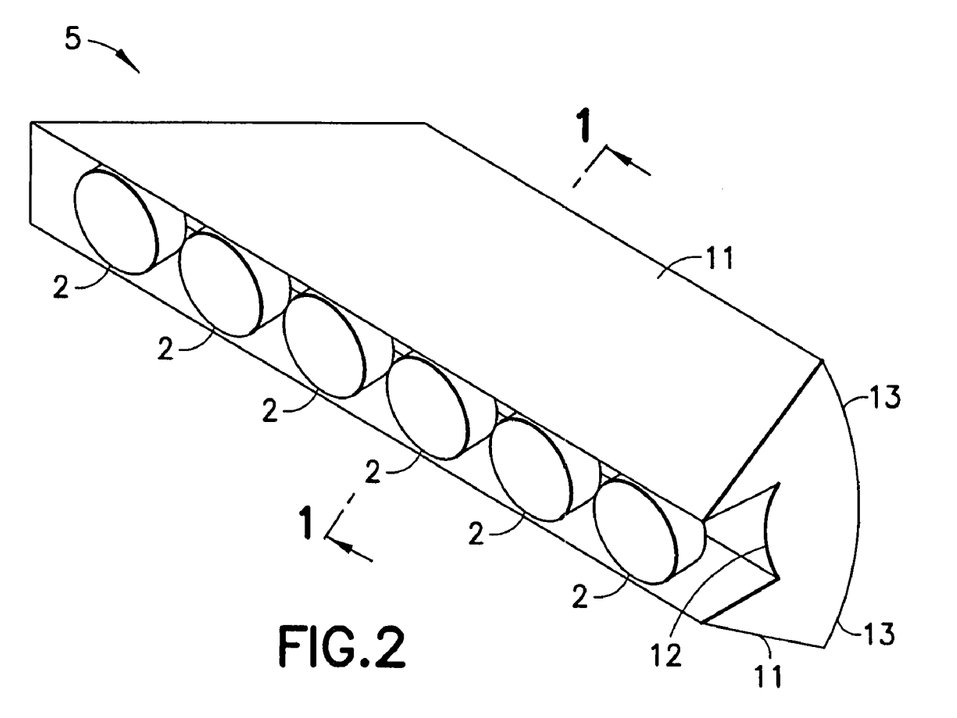
FIG. 2 is a perspective view of an array of LED's as shown in FIG. 1.

FIG. 2 depicts a perspective view of an array 5 of six efficient beam-forming optical LEDs 2 of the subject design. The perspective view of FIG. 2 also shows in cross section previously described optical surfaces 11, 12 and 13.

The need to place the cross bin light source below a valence plane and yet still make the area of the source large enough to provide a necessary narrow beam size for illumination presents conflicting design requirements that compromise the optical coupling efficiency of the system. Embodiments of this disclosure achieve a significant increase in optical coupling efficiency gained when the area of the beam-forming optics is made larger than the area allowed by a valence line-of-sight restriction. An aperture is used to select only a desired portion of the available area. The selection of a specific aperture area must be varied in accordance with the optical properties of the selected LED source.

The beam-forming optics of the new illumination system will be better understood in the context of deployment in a passenger aircraft cabin. The passenger compartments of commercial airlines today have become relatively standardized. The space in passenger cabins is quite limited due to the external fuselage size and the configuration of the airplane itself.

An aircraft passenger cabin will typically have a floor panel, a pair of sidewall members or panels, a ceiling panel or structure, and a plurality of passenger seats. As is common with larger commercial passenger airliners today, the passenger seats in each row are often arranged in three sets, with two aisles.

The exterior of the typical airplane fuselage is clad with an exterior skin which is attached to longeron and/or frames and/or bulkhead members or other structure. The bulkhead members provide support and stability for the fuselage of the aircraft.

The passenger cabin has a plurality of rows of outboard storage or stowage bins, which are provided generally at the intersection of the sidewall members and the ceiling structure. If the airplane has a twin-aisle passenger cabin, rows of inboard storage bins are also provided over the central row of passenger seats. The storage/stowage bins door or bins themselves may be hinged relative to the passenger cabin such that they rotate from an up or closed position to a down or open position. The storage/stowage bins are used for storing luggage, packages, and other personal items of the passengers during flight.

The ceiling system of a two-aisle aircraft has a central structure in which the two inboard storage/stowage bins are positioned above the central section of passenger seats. The central ceiling structure may be suspended and held in place in the aircraft by conventional strut members. In one embodiment, additional ceiling structures are positioned between the central stowage bins and the two rows of outboard storage/stowage bins.

Figure 3:
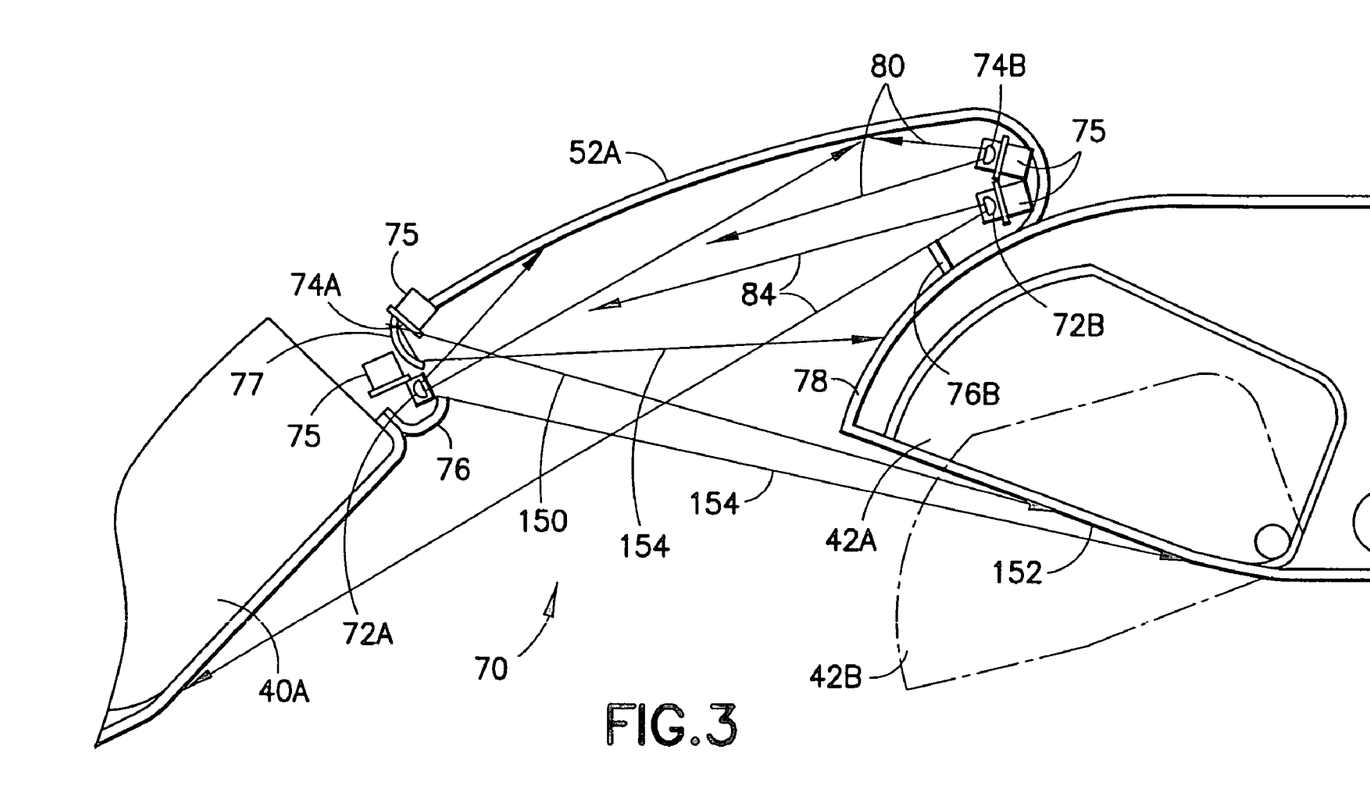
FIG. 3 is a cross section of a portion of the ceiling structure and stowage bins of an aircraft passenger cabin.

FIG. 3 is a cross section of a portion 70 of an aircraft cabin depicting two overhead bins and the ceiling area between the overhead bins. As shown more particularly in FIG. 3, an embodiment of the subject illumination system may be installed in conjunction with a ceiling panel member 52A, two pairs of lighting fixtures 72A, 72B, 74A and 74B, as well as structural surfaces 76, 76B and 78 on the outboard and inboard surfaces of the stowage/storage bins 40A and 42A, respectively. It will be understood that structural surfaces 76 and 76B may be valence members causing line of sight or other light source height restrictions in aircraft illumination applications. The subject improved efficient beam-forming optical LEDs may be utilized for any or all of the aforementioned lighting fixture locations but will be particularly useful in avoiding the problems associated with line of sight requirements.

Inboard stowage bin 42A is also depicted in its lowered position 42B by the interrupted lines. In this regard, the structure and configuration of the ceiling panel 52A, together with the wall panel members 76 and 78 position the lighting elements 72A, 72B, 74A and 74B at positions such that they cannot typically be viewed by the passengers in the passenger cabin. In this embodiment, structural surface 76 may be considered a valance structure for obstructing a passenger from directly viewing light emitted from lighting fixtures 72A and 74A.

In this embodiment, the lighting fixtures 72A, 74B may be the subject efficient beam-forming optical LEDs, preferably utilizing RGBW-type lighting in this application and which are directed to focus their illumination on the ceiling panel 52A. For example, in the case of fixture 74B, its beam is indicated by the arrows 80 in FIG. 3. The lighting fixtures 74A and 72B may also be efficient beam-forming optical LEDs and which here are preferably white LED lights or RGBW LED lights of a beam width and angle that directs the light across and under the ceiling 52A to illuminate the stowage/storage bins and surfaces located opposite from the lighting fixtures. The white light LEDs may be selected to have specific color temperatures to achieve specific lighting effects or to correspond to available vendor parts. This is indicated for fixture 74A, for example, by the arrows 150 and 154 in FIG. 3, and in the case of fixture 72B the beam is indicated by arrows 84. Heat sink members 75 are provided adjacent the lighting fixtures in order to reduce operating temperatures and extend lighting fixture service life.

The surface of the ceiling member 52A can be illuminated in any color without limitation, such as blue emulating the sky, while the rest of the area below is illuminated in white light or another light color.

The pairs of lighting fixtures 72A and 74A on the one hand and 72B and 74B on the other can provide uniform illumination of the ceiling without areas of significantly different intensities. The pairs of lighting fixtures may also allow illumination in the passenger cabin below the ceiling panels in a more uniform and pleasant manner. The cross bin lighting system utilizing the LEDs with efficient beam-forming optics, as shown in FIG. 3, provides these advantages.

In the embodiment of the disclosure depicted in FIG. 3, an optional reflector member is utilized to help focus and direct the light rays from one of the lighting fixtures onto the opposite bin and adjacent surface. Reflector member 77 of this type, as shown in FIG. 3, may be utilized in conjunction with a single light fixture 74A. The reflector 77 preferably has the shape of a conic section, but can be any other shape which performs the same purpose and produces the same result. The reflector member 77 is hidden from view behind the wall or valence member 76. Reflector member 77 can be made of any material, but preferably is made from a molded plastic material or other lightweight material.

Embodiments allow better directional control of the light beams within the passenger cabin, and the alternate use of colored light produces effects within the cabin which are pleasing to the passengers and also create the impression of space and height.

Figure 4:
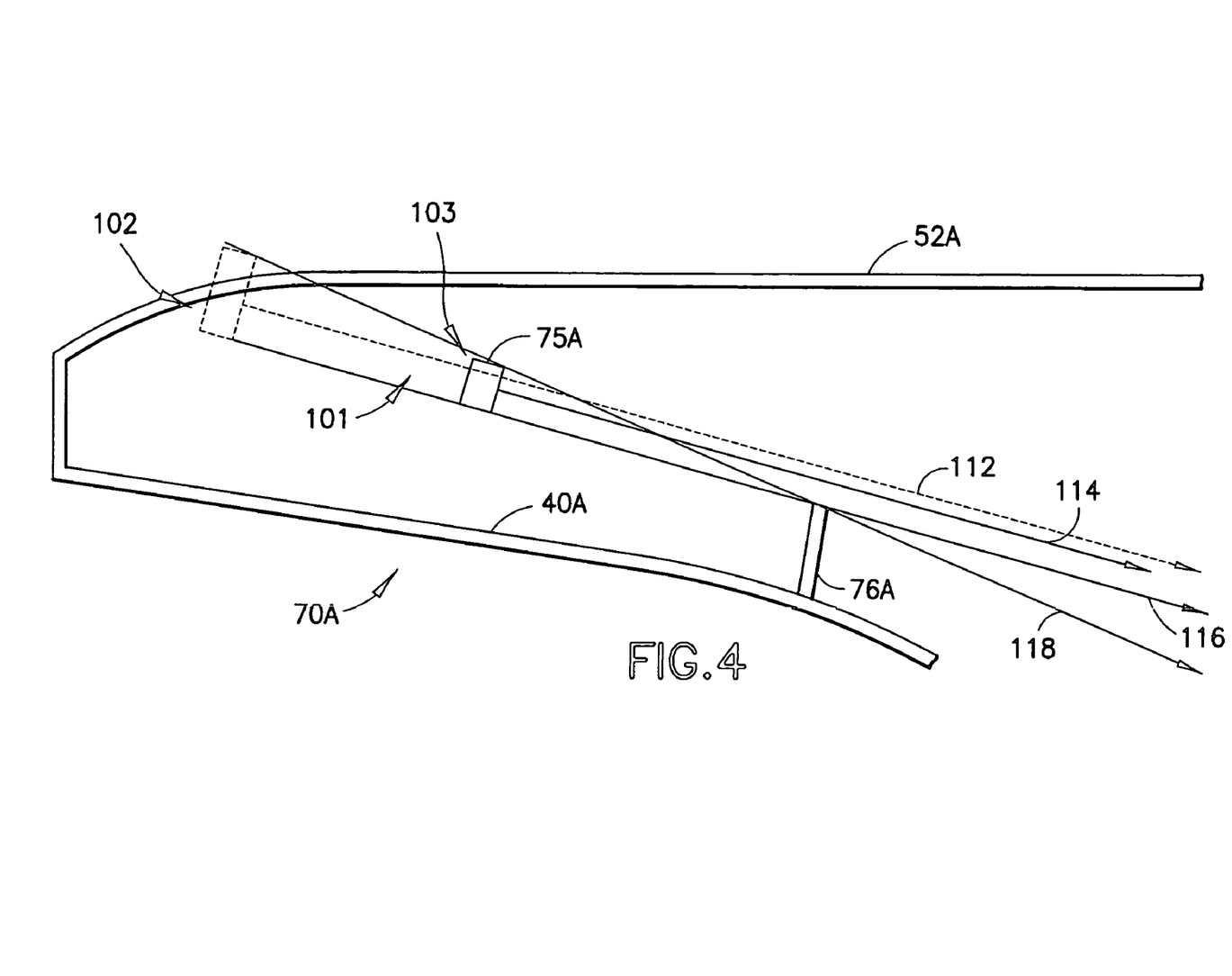
FIG. 4 is an alternate embodiment of the aircraft illumination system.

FIG. 4 is a cross section view showing further details of illumination system 70A which is another embodiment of the subject design. In FIG. 4, ceiling panel 52A is connected to stowage bin surface 40A and valence member 76A. Lighting fixture 75A, which is comprised of an efficient beam-forming optical LED and a heat sink element as necessary, is deployed within light fixture zone 101. Light fixture zone 101 is determined by the requirement that a light fixture placed behind valence member 76A must allow a light beam to pass over the valence while properly reaching an opposite surface as depicted in FIG. 3. In FIG. 4, light fixture zone 101 has a maximum allowable light fixture location 103 beyond which an illumination source would not be aimed properly nor meet restrictions imposed by valence height requirements. Light fixture zone 101 also has an optimum light fixture location 102 meeting all such illumination and height restrictions. It will be recognized that the light source must be hidden behind a valence opposite the stowage bin to be illuminated, that is, below the tangent plane to the opposite bin. The height of the optic is determined by the LED properties and beam spot size at the opposite bin. For instance, the larger the optic, the further back behind the valence it must be placed to stay below the tangent plane and minimize unwanted visible glare.

FIG. 4 also depicts beam 112 from the optical center of a lighting device placed at the optimum light fixture location 102; beam 114 from the optical center of a lighting device placed at the maximum allowable light fixture location 103; beam 116 from the bottom of a light fixture at either location 102 or 103 and which is limited by valence member 76A; and beam 118 from the top of a light fixture at either location 102 or 103 and which is also limited by valence member 76A.

An LED device commonly used for illumination applications is a Luxeon batwing-type LED, Model LXHL-BW02, which is a white emitter device commercially available from Phillips Lumileds Lighting Company, San Jose, Calif. The expression "batwing" refers to the typical pattern of a graph of its spatial radiation when relative intensity is plotted against angular displacement in degrees from its optical center. According to data published by the manufacturer, the LED Model LXHL-BW02 has intensity peaks near 40° angular displacement on either side of its optical axis.

When this LED is used in combination with beam forming optic 4 described in connection with FIG. 1, the wide angle light from the LED that follows beam paths such as 20 will have higher intensity than that near the optical axis, as represented by beam path 21. In such cases it is advantageous to offset the aperture formed between blocking elements 3 and 3A away from the optical axis of the LED/beam-forming optic in order to improve the optical coupling efficiency, hence providing the "efficient beam-forming optical LED" device and system discussed in detail above. Multiple LED sources may be arranged along the length of the optic to produce an extended line source.

As discussed above, FIG. 1 shows a model of a typical batwing LED coupled to a suitable beam forming optic. The lens diameter is 6 mm and the die, cup and lens of this model were configured to provide a beam angular profile shown of the batwing-type having dual maxima of relative intensities peaking at an angular displacement of about 40 and −40 degrees from its optical center. The beam forming optic has an exit height of 18 mm and a width of 11 mm. The inner cylinder radius is 6 mm and the outer cylinder lens radius is 18 mm.

Figure 5:
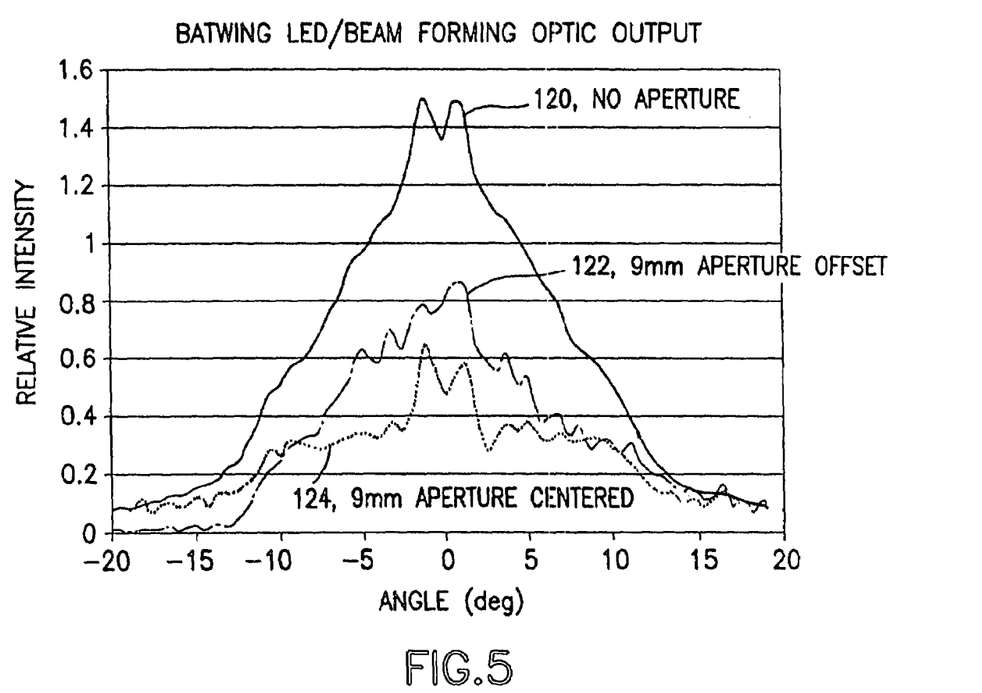
FIG. 5 illustrates LED beam divergence data for alternative embodiments of the disclosure.

In an application of the lighting system of this type, the data described in FIG. 5 was obtained. When an aperture was not utilized in combination with the beam forming optic, data curve 120 of FIG. 5 indicates that about 90% of the light emitted from the LED is coupled by the beam forming optic and its beam divergence is about 14° FWHM.

In a particular cross bin illumination application utilizing the beam forming optic, the allowable height behind the valence is only 9 mm. In FIG. 5, data curve 122 shows the beam divergence pattern when a 9 mm aperture is applied to the optic with an offset of 4.5 mm so that the illumination pattern is derived from the center to one edge of the beam forming optic. Although the overall intensity is reduced by 50%, the beam still has a FWHM divergence near 14°. Curve 124 shows the effect placing the aperture over the center portion of the beam forming optic. The overall intensity is reduced by 70% and the beam FWHM divergence is increased to about 24°. The advantage of the use of the offset aperture to improve optical coupling efficiency is clearly demonstrated by curves 122 and 124.

Figure 6:
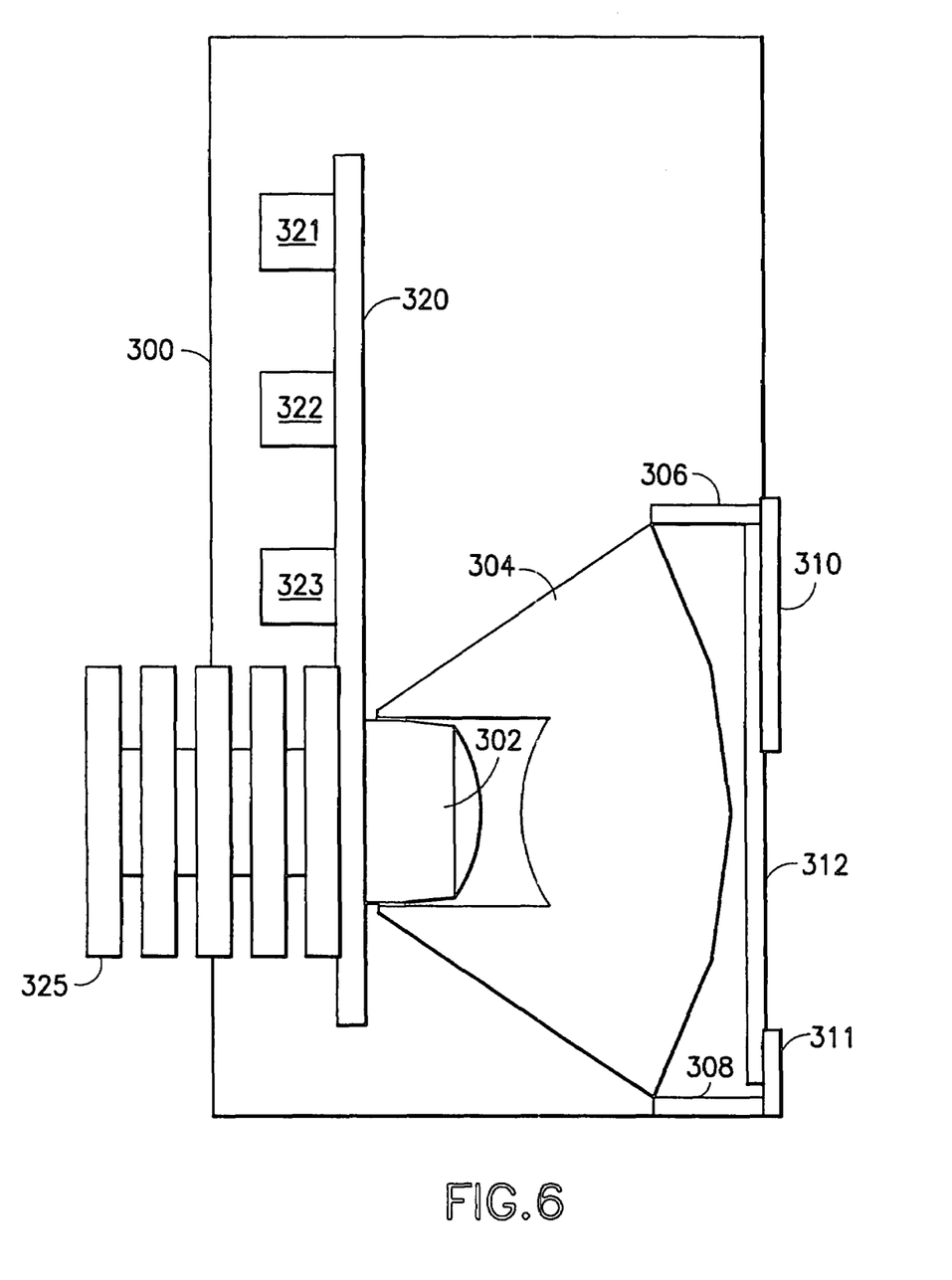
FIG. 6 is a cross section of one embodiment of the aircraft illumination system.

FIG. 6 is a cross sectional view of an embodiment of the aircraft illumination system having enclosure 300 which is typically made of aluminum or a molded engineering thermoplastic approved for use in aircraft applications. An example of the latter is polycarbonate thermoplastic. Typically the interior surfaces of the enclosure facing the LEDs will have a matte black surface. In the embodiment depicted in FIG. 6, an efficient beam forming optical LED device is comprised of light emitting diode 302, beam forming optic 304 mounted within enclosure 300 by optic mounts 306 and 308. As discussed earlier, the efficient beam forming optical LED device is made relatively more efficient by use and placement of an aperture here represented between aperture elements 310 and 311 which are mounted to the enclosure in front of the optic. The illumination beam is emitted through transparent member 312, usually of suitable plastic material. LED 302 is also mounted on a conventional power supply control board 320 which may additionally have power supply and intensity control elements 321-323. In this embodiment, LED 302 and control board 320 are also affixed to conventional heat sink member 325.

Figure 7:
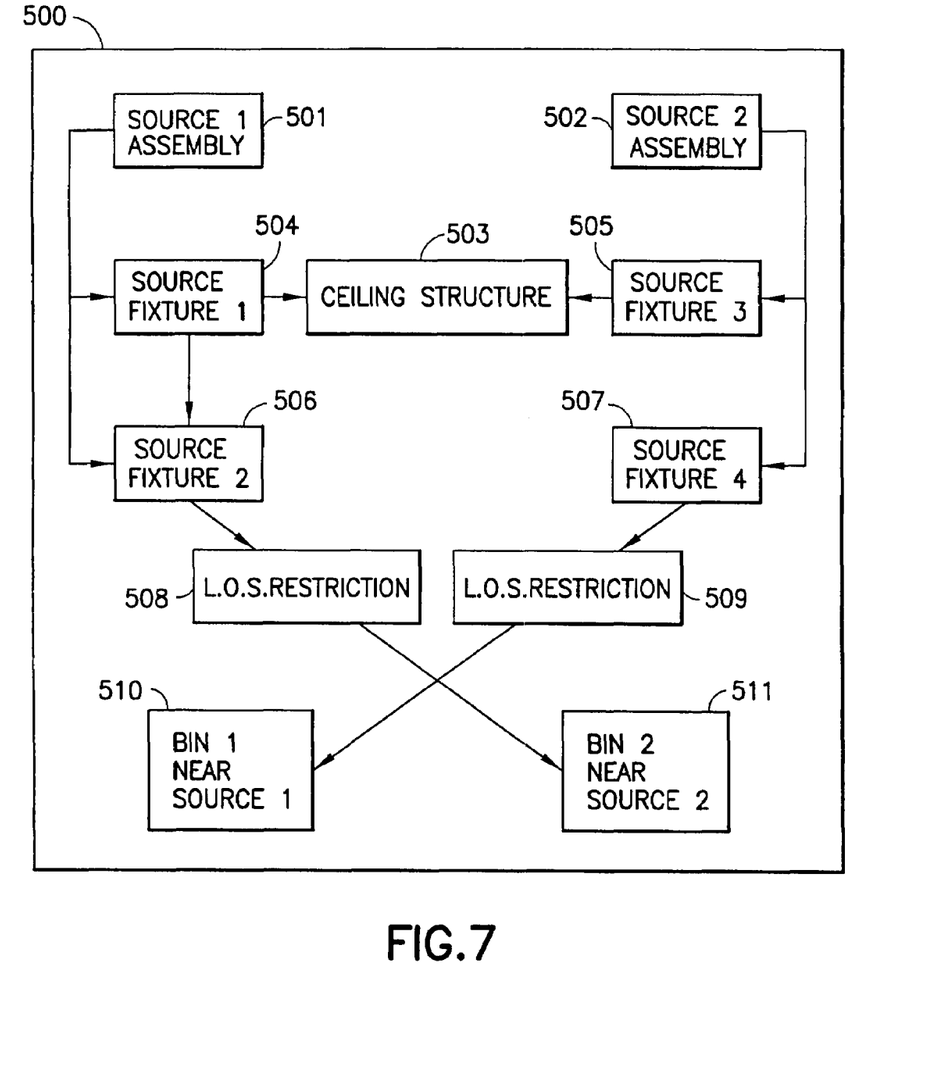
FIG. 7 is a schematic diagram of the aircraft illumination system.

FIG. 7 is a schematic representation of an embodiment of aircraft cross bin illumination system 500. Lighting source assembly 501 is provided by lighting source fixture 504 which is affixed near ceiling structure 503 for illumination of an area of the aircraft ceiling. Similarly, lighting source assembly 502 is provided on the opposite side of the ceiling area where it is affixed by lighting source fixture 505.

Light source assembly 501 also has a second source fixture 506 which utilizes the efficient beam-forming optical LED illumination device described in connection with the earlier figures. The efficient beam forming optical LED is configured to avoid any line of sight (L.O.S.) restrictions 508 and thereby effectively illuminate opposite stowage bin 511. A fourth light source fixture 507, also utilizing an efficient beam forming optical LED operates similarly to provide the intended cross bin illumination, while avoiding visible glare and the other problems discussed above.

While the illumination device and system has been described in connection with one or more embodiments, it is to be understood that the specific mechanisms and techniques which have been described are merely illustrative and numerous modifications may be made to the methods and apparatus described without departing from the spirit and scope of the improvements defined by the appended claims.

What is claimed is:

1. An illumination system for a ceiling structure of an airplane having at least a first row of stowage bins adjacent said ceiling structure, said illumination system comprising:
   a. an illumination device placed adjacent said ceiling structure and opposite said first row of stowage bins, said illumination device further comprising a lighting source fixture;
   b. a light emitting diode attached to said lighting source fixture wherein said light emitting diode is subject to a line of sight height restriction for illuminating a stowage bin positioned opposite said lighting source fixture;
   c. a beam forming optic coupled to said light emitting diode;
   d. a height limiting aperture placed in the path of an output beam formed by said coupled optic and light emitting diode configured to limit the height of the output beam and maintain efficient optical coupling whereby said aperture is offset from an optical center of said illumination device thereby limiting the height and enhancing the relative intensity of a coupled beam and thereby providing an efficient beam forming optical light emitting diode device configured with a larger area of illumination from the beam-forming optics than an area allowed by the line-of-sight restriction, thereby providing an increase in optical coupling efficiency.

2. The illumination system of claim 1 wherein said lighting source fixture is placed behind a valence member providing said line of sight height restriction for illuminating said stowage bin positioned opposite said lighting source fixture and effective for providing at least a portion of light from said fixture to overcome said valence height restriction to reach and illuminate an opposite stowage bin at a tangential point.

3. The illumination system of claim 1 wherein a pair of said efficient beam forming optical light emitting diode devices are positioned on either side of said ceiling structure, each adjacent an opposite stowage bin and effective for illuminating said oppositely positioned bin, thereby providing aircraft cabin cross bin lighting.

4. The system of claim 1 whereby a plurality of said illumination devices are arranged in a longitudinal array for the illumination of an aircraft cabin.

5. The illumination system of claim 1 further comprising a heat sink member attached to the lighting source fixture for extending the operational life of the device.

6. The illumination system of claim 1 further comprising power supply and control means integrated with the illumination device.

7. The illumination system of claim 1 further comprising a reflector member for precise aiming of an illumination beam from said lighting fixture.

8. The illumination system of claim 7 wherein said reflector member has a conic shape.

9. The illumination system as described in claim 1 wherein said ceiling structure has a curved configuration.

10. The illumination system as described in claim 1 wherein additional lighting devices direct light to the ceiling structure.

11. The illumination system as described in claim 10 wherein said direct light is a blue color light.

12. The illumination system as described in claim 1 wherein the light emitting diodes are selected from the group consisting of white LED lights, RGB LED lights and RGBW LED lights.

13. The illumination system as described in claim 1 wherein a first lighting source fixture is positioned above a second lighting source fixture.

14. The illumination system as described in claim 13 wherein said first and second lighting source fixtures are positioned adjacent one another in longitudinal alignment.

15. The illumination system as described in claim 1 wherein said lighting source fixture comprises a plurality of LED lights.

16. A method for illuminating a ceiling structure of an airplane having at least a first row of stowage bins adjacent said ceiling structure, said method comprising:

a. placing an illumination device adjacent said ceiling structure and opposite said first row of stowage bins, said illumination device further comprising a lighting source fixture;

b. attaching a light emitting diode to said lighting source fixture wherein said light emitting diode is subject to a line of sight height restriction for illuminating a stowage bin positioned opposite said lighting source fixture;

c. coupling a beam forming optic to said light emitting diode;

d. placing a height limiting aperture in the path of an output beam formed by said coupled optic and light emitting diode, whereby the beam forming optic provides a larger area of illumination than an area allowed by the line of sight height restriction thereby providing an increase in optical coupling efficiency, and e. offsetting said aperture from the optical center of said illumination device thereby coupling said beam by offsetting the aperture from an optical center of the device, limiting the height of said coupled beam, and enhancing the relative intensity of said coupled beam, thereby providing an efficient beam forming optical light emitting diode device having a larger area of illumination than allowed by the line-of-sight restriction, thereby providing an increase in optical coupling efficiency effective for aircraft cabin illumination.

17. The method of claim 16 further comprising the step of positioning said lighting source fixture behind a valence member thereby providing said line of sight height restriction imposed by said valence when illuminating a stowage bin positioned opposite said lighting source fixture and providing at least a portion of light from said fixture over said valence reaching and illuminating an opposite stowage bin at a tangential point.

18. The method of claim 16 further comprising the step of positioning a pair of said efficient beam forming optical light emitting diode devices on either side of said ceiling structure, each adjacent an opposite stowage bin and illuminating said oppositely positioned bin and thereby providing aircraft cabin cross bin lighting.

* * * * *